United States Patent [19]

Hartle et al.

[11] Patent Number: 4,640,310

[45] Date of Patent: Feb. 3, 1987

[54] VARIABLE AIR-PILOTED AIR REGULATOR SYSTEM

[75] Inventors: Ronald J. Hartle, Lorain; Robert C. Hall, Strongsville, both of Ohio

[73] Assignee: Nordson Corporation, Amherst, Ohio

[21] Appl. No.: 686,206

[22] Filed: Dec. 26, 1984

[51] Int. Cl.[4] .............................................. F16K 11/20
[52] U.S. Cl. .................... 137/883; 137/487.5; 137/505.42; 137/510; 137/885; 137/906
[58] Field of Search ................. 137/14, 487.5, 489.5, 137/505.42, 509, 510, 505.14, 877, 878, 881, 883, 885, DIG. 7; 239/570, 704

[56] References Cited

U.S. PATENT DOCUMENTS

| 2,622,610 | 12/1952 | Rowe et al. | 137/510 X |
| 2,806,481 | 9/1957 | Faust | 137/505.42 X |
| 2,998,256 | 8/1961 | Liphins | 137/510 X |
| 3,689,025 | 9/1972 | Kiser | 137/DIG. 7 X |
| 4,036,247 | 7/1977 | Baugh | 137/883 X |
| 4,248,379 | 2/1981 | Hollstein et al. | 239/704 X |
| 4,353,385 | 10/1982 | Maisch et al. | 137/510 X |

Primary Examiner—A. Michael Chambers
Assistant Examiner—John C. Fox
Attorney, Agent, or Firm—Wood, Herron & Evans

[57] ABSTRACT

An air regulator system using air-piloted valves for controlling a plurality of different air flows in a powder spray system. A control regulator is used to set the flow rates of a plurality of flow regulators, each of which is associated with a particular air flow in the powder spray system.

16 Claims, 5 Drawing Figures

VARIABLE AIR-PILOTED AIR REGULATOR SYSTEM

FIELD OF THE INVENTION

This invention relates to remotely controllable air regulator systems and more particularly to such systems for regulating a plurality of air streams used in operating a powder spray system.

BACKGROUND OF THE INVENTION

There are numerous systems in which a plurality of air streams are employed in operation of the system. For example, a number of different air streams are used in operating a powder spray system. Typically, powder spray systems include a powder pump for transporting air entrained powder through a pneumatic conveyor line to a powder spray gun. Within the pneumatic conveyor line is a low pressure venturi pumping chamber. This chamber is intersected by a powder supply passage through which powder is supplied (i.e., sucked) from a fluidized bed of powder created by a fluidizing air stream. In order to meter or control the rate of flow of powder from the fluidized bed into the venturi pumping chamber, such pumps ordinarily further include a metering or atomizing air stream which injects a controlled flow of air into the powder supply passage. This atomizing air flow controls the amount of air which is mixed with the powder entering the venturi chamber to thereby adjust the powder/air mixture reaching the delivery air stream.

A powder spray system may thus have three different air streams to be controlled in operation of the system, namely, the fluidizing air stream, the atomizing air stream, and the delivery air stream. All three air streams may operate at different pressures, all of which interact to determine the powder flow rates. The flow rates of the air streams are individually adjustable to compensate for such factors as the type of powder being sprayed, the substrate being sprayed, the type of gun being used and the like. It is therefore important that the air pressure for each of these air streams is capable of variation to independently adjust each of the air flow rates.

One way to control the air stream air pressure values in an electrostatic powder system has been to put a manually operated valve or pressure regulator in each of the air flow lines to independently set the air pressures for each of the different air streams. Use of such manually operated air stream controls have a number of drawbacks, foremost of which is the fact that they cannot be used in any system which is to be fully automated. An operator must consequently be present to manually set or adjust each of the various regulators.

At least one system has been devised in which a number of solenoid operated air regulators are located in each air stream line. Each regulator in a particular air stream is manually set to a different flow rate, i.e., air pressure value. In operation, one regulator in a series is remotely actuated to provide the desired flow rate in that particular air stream. The problem with this type of system is of course in the number of regulators which are required to provide the desired flow rate variability, which results, among other things, in an increase in the size of the regulator system as well as an increase in its cost.

It is also known to use an electronic system to monitor a plurality of air pressures in a powder spray system as well as to variably regulate the individual air streams. Although such an electronic system has the ability to provide variable flow rate regulation of the individual air streams, and do so remotely from the powder pump, the electronic system suffers serious drawbacks in terms of the size of the regulator system as well as its cost, with the expense of the system perhaps being the most significant factor.

SUMMARY OF THE INVENTION

It is a principal objective of this invention to provide an air regulator system which is capable of variably and remotely controlling the flow rates of a plurality of air streams, and which is relatively small in size and much less expensive than the aforementioned electronic regulator system. To this and other ends, the present invention resides in an air regulator system which uses variable air-piloted pressure regulators for controlling air flow in a plurality of air streams. The entire air regulator system assembly of this invention basically comprises one air-piloted flow regulator for each air stream, an air-piloted control regulator for setting the flow regulators, a valving mechanism, such as a solenoid valve, associated with each of the regulators, and a manifold assembly interconnecting the various regulators. In a preferred embodiment, the entire air regulator assembly for controlling three air streams has dimensions on the order of $4'' \times 4'' \times 4''$ which is about 1/10 the size of the aforementioned electronic system. The overall cost of the air-piloted regulator system is also substantially reduced, largely due to the use of inexpensive air-piloted regulators; the cost of this system is about 1/6 that of its electronic counterpart.

More particularly, the variable air-piloted air regulator system of this invention comprises a plurality of air stream regulators each having an air-piloted valve which is variably set to control a particular air stream. For example, in a present embodiment which is particularly adapted for use in regulating the various air streams used in an electro-static powder spray system, the air regulator system comprises three primary or flow regulators in the form of a delivery air stream regulator, atomizing air stream regulator, and fluidizing air stream regulator, and a control regulator used in setting the three primary regulators. Each of the regulators has an upper chamber and a lower chamber which are separated by an air-piloted valve mechanism, such as a diaphragm which forms part of a diaphragm valve. The diaphragm valve controls air flow through the lower chamber of the regulator to thereby control the pressure of the particular air stream. Pressurized air, e.g., from a compressor or shop air, is provided to each respective regulator lower chamber from a first manifold; it is this compressor air from the first manifold which is regulated to form the various air streams.

The diaphragm valves of each of the primary regulators are individually set by operation of the control regulator. To this end, a second manifold interconnects each of the upper, or diaphragm, chambers of the flow regulators with the lower chamber of the control regulator so that each flow regulator can be independently set in the following manner.

Air is first supplied to the upper diaphragm chamber of the control regulator from the first manifold (compressor air) to a first predetermined pressure. In a present form of the invention, this is accomplished through use of a solenoid valve which is opened for a predetermined period of time to allow air to flow into the diaphragm chamber of the control regulator to establish the first predetermined pressure, and then the valve is closed. Pressurization of the control regulator diaphragm chamber thereby causes the diaphragm valve to open an inlet in the lower chamber of the control regulator to allow a flow of air into the lower chamber from the first manifold, i.e., compressor air from the first manifold. In a present embodiment, the movement of the diaphragm valve is made to correspond to a predetermined rate of air flow into the lower chamber which is directly related to the amount of pressure in the upper chamber. For example, pressurizing the upper chamber to about 20 psi operates the diaphragm valve to allow about a 20 psi air pressure to flow into the lower chamber.

Air flows from the control regulator's lower chamber into the second manifold where it is routed to each of the diaphragm chambers of the three flow regulators. When the air pressure in the control regulator's lower chamber and the second manifold approximately equalizes with the pressure of the control regulator's diaphragm chamber, the diaphragm valve reseats closing the lower chamber. A predetermined air pressure is thus established in the second manifold (and lower chamber of the control regulator) in this manner; given the above example, this pressure in the second manifold would also be about 20 psi. A solenoid valve is associated with each of the flow regulators to control airflow from the second manifold to a respective diaphragm chamber.

The air pressure established in the second manifold is used to set one or more of the flow regulators. For example, assuming that the fluidizing regulator is to be set for a fluidized air stream flow rate corresponding to the pressure established in the second manifold, e.g., 20 psi, the solenoid valve of the fluidizing regulator is actuated allowing air to flow from the second manifold into the fluidizing regulator's upper diaphragm chamber. This pressurizes the diaphragm chamber to the level of the second manifold pressure, and then the solenoid valve is closed trapping this pressurized volume of air in the diaphragm chamber. Pressurization of the diaphragm chamber in turn moves the diaphragm valve of the fluidizing regulator a predetermined amount to allow a flow of air from the first manifold to pass through the lower chamber of the fluidizing regulator to establish a fluidizing air stream at a pressure corresponding to that established in the diaphragm chamber, e.g., about 20 psi according to the above example.

The diaphragm chamber of the control regulator and the second manifold can then be exhausted, such as through the use of another solenoid valve adapted for this purpose, and the entire procedure repeated to set each of the other flow regulators. For example, a second predetermined pressure can be established in the diaphragm chamber of the control regulator to thereby set a pressure for the atomizing regulator which is different from that of the atomizing regulator, and so on.

This invention thus provides a method and apparatus for independently and variably setting the pressures of a plurality of air streams pneumatically through the use of a small number of relatively inexpensive air-piloted regulators, solenoid valves and a manifold assembly. The air regulator system is readily adaptable for remote control operation by a programmable controller, such that the solenoids can be selectively and rapidly fired to control and regulate the various air pressures in an entirely automated system.

These and other objects and advantages of this invention will be more readily understood upon consideration of the following detailed description of the invention taken in conjunction with the drawings, in which:

DETAILED DESCRIPTION OF THE INVENTION

As previously indicated, this invention in a variably air-piloted air regulator system was developed for use in, and has particular application for, regulating a plurality of different air streams used in an electrostatic powder spray system. The detailed description of the invention which follows describes the air regulator system as used in such a powder spray application. It should be recognized though that the invention is not limited to this particular application, but could be used to advantage in other applications where the flow rates of a plurality of fluid streams are to be independently and variably regulated.

General Organization

Figure 1:
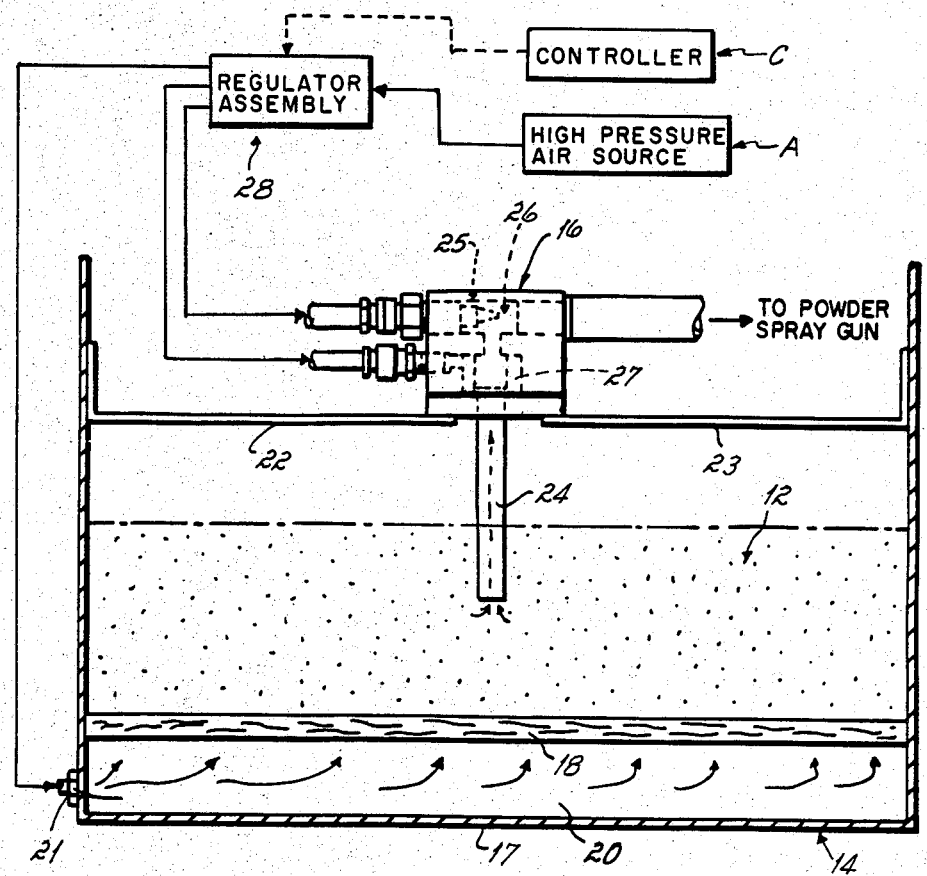
FIG. 1 is a diagrammatic illustration of a powder spray system incorporating the air regulator system of this invention.

Referring to FIG. 1, there is illustrated a powder spray system for transporting solid particulate powder 12 from a fluidized bed container 14 through a powder pump 16 to a powder spray gun (not shown). The fluidized bed container 14 comprises a conventional open-top container having four sidewalls and a bottom wall 17. Spaced upwardly from the botttom wall is an air pervious wall 18 which extends between the four sidewalls and is secured thereto. This air pervious wall 18, the parallel bottom wall 17, and the sidewalls define an air chamber 20 into which high pressure air is introduced through a sidewall fitting 21. This high pressure air passes into the air chamber 20 and then upwardly through the pervious wall 18 to fluidize the powder 12 within the container 14. A powder pump 16 is mounted within the container, as by a pair of support brackets 22, 23. A conduit or tube 24 extends downwardly from the pump 16 into the container 14. Powder is supplied from the fluidized bed through the tube 24 to the interior of the pump 16.

The powder pump 16 has a pneumatic conveyor delivery line 25 through which a stream of pressurized delivery air is directed to draw powder through the siphon tube 24 and deliver it to the powder spray gun. To this end, a low pressure venturi pumping chamber 26 is formed at the intersection between the delivery line 25 and the powder supply line (tube 24).

In practice, the high pressure air supplied to the delivery line 25 is directed into the venturi pumping chamber 26 and subsequently out of the pump 16 to the powder spray gun. In the course of passage through the pneumatic conveyor line 25, the delivery air flow lowers the pressure within the venturi pumping chamber 26, which serves to draw powder through the siphon tube 24 into the pumping chamber, where it is then delivered to the spray gun.

The powder pump 16 further includes a metering or atomizing chamber 27 open to the tube 24. It will be noted that the powder delivery line has openings therein in the region of the atomizing chamber 27 through which a high pressure air stream supplied to the atomizing chamber 27 can react with the powder being transported to the chamber 27 through the tube 24. That is, the high pressure atomizing air which is supplied to the atomizing chamber 27 controls the amount of air mixed with the powder flowing to the venturi pumping chamber 26 of the pump 16. Changes in the pressure of the air supplied to the atomizing chamber thus varies the air/powder ratio in the tube 24.

Figure 2:
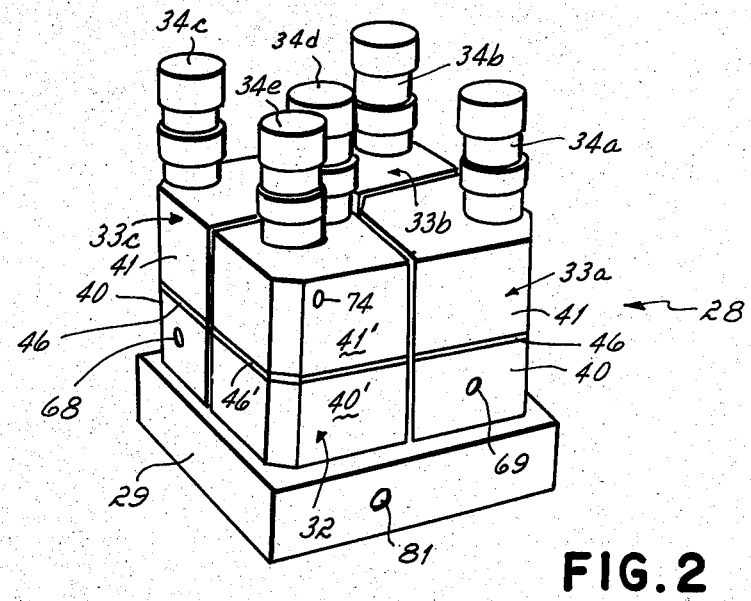
FIG. 2 is a perspective view of an air regulator assembly made in accordance with the teachings of this invention.

Each of the different air streams, i.e., delivery air, atomizing air and fluidizing air, are each independently regulated by the variable air-piloted air regulator system of this invention, which is generally indicated at 28. As will be explained in more detail hereinafter, a source of high pressure air A, such as air from an air compressor at a pressure of around 100 psi, is connected into a manifold block 29 through which the high pressure air is directed to a control regulator 32 and a plurality of air stream flow regulators 33a–33c (FIG. 2). A plurality of solenoid valves 34a–34e are used to control air flow through the regulators, with the solenoid valves being remotely operated by a suitable controller C. The controller C can advantageously be a programmable controller which selectively operates the solenoids to control and regulate the various air stream pressures and corresponding flow rates in the powder system.

Figure 3:
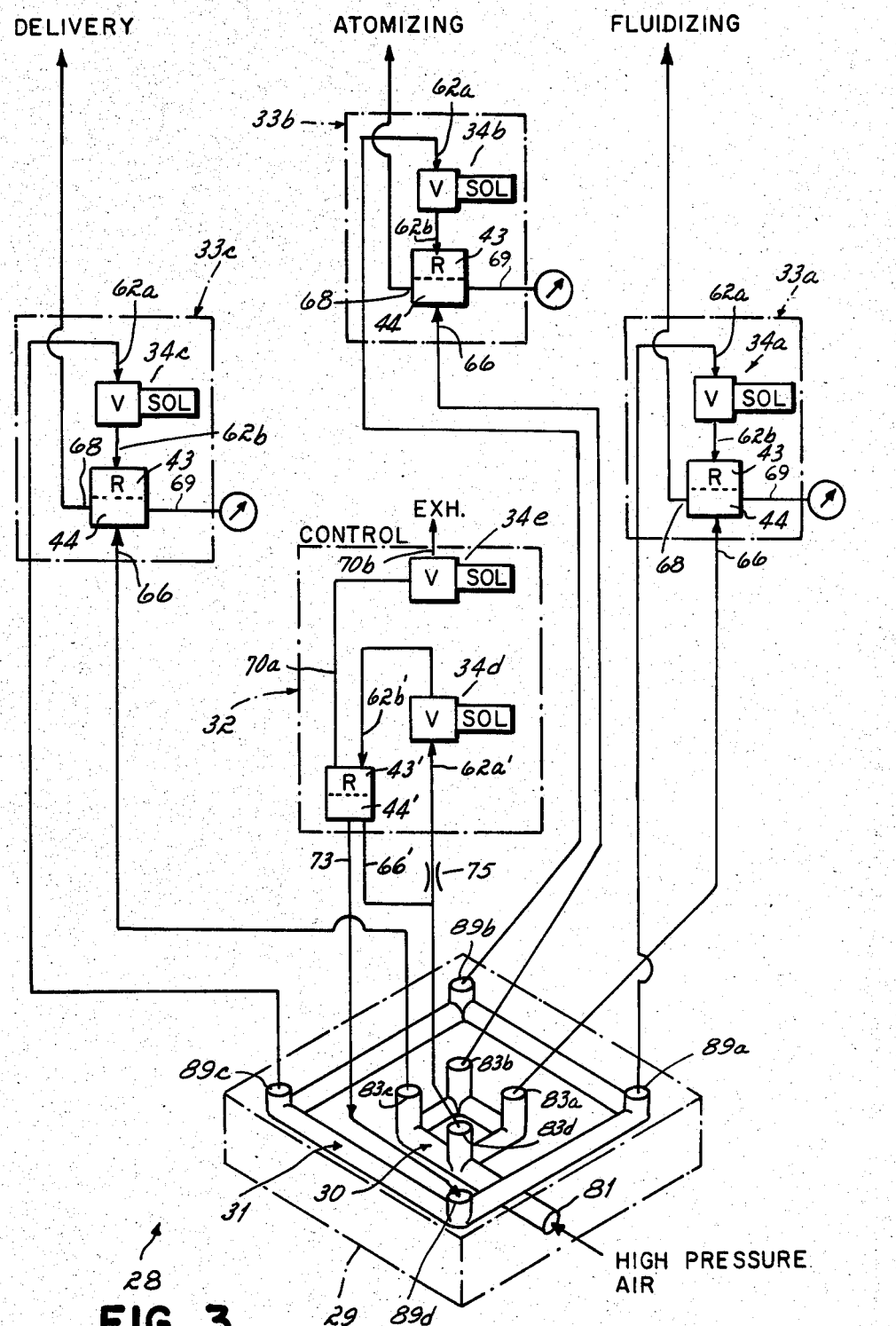
FIG. 3 is a diagrammatic view of the manifolds, valves and regulators making up the air regulator assembly shown in FIG. 2.

As best shown in FIGS. 2 and 3, the air regulator system 28 is generally comprised of the manifold block 29 having a first manifold 30 and a second manifold 31 formed therein, the control regulator 32, and air stream flow regulators 33a, 33b and 33c which are arranged in a compact rectangle atop the manifold block 29. Each of the flow regulators 33a–33c has an inlet solenoid valve 34a–34c, respectively; the control regulator 32 has an inlet solenoid valve 34d and an outlet solenoid valve 34e. The operation and use of these valves will be described in more detail hereafter. Suitable electrical connections (not shown) are provided for the solenoid valves so that they can be remotely operated. It will be noted that in this embodiment, the entire regulator assembly 28 is approximately a 4" cube in dimension, and is thus advantageously very small and compact.

Regulator Construction

Figure 5:
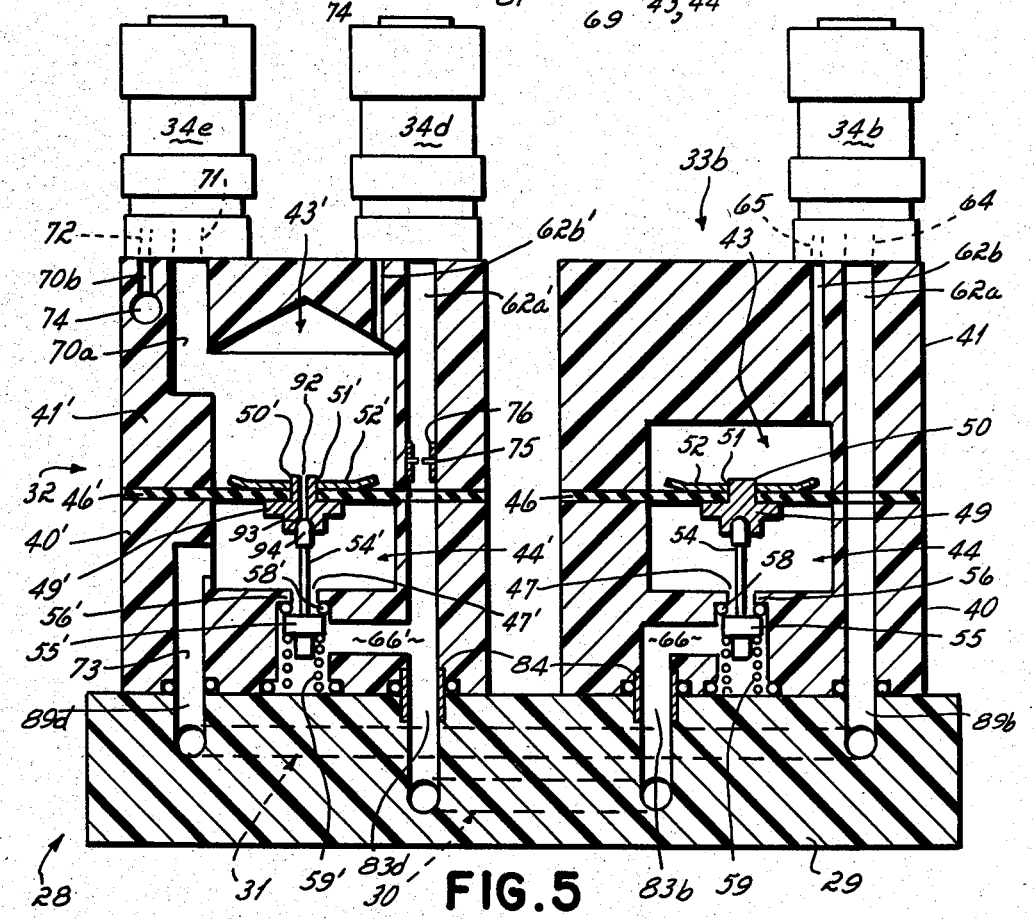
FIG. 5 is a cross-sectional view taken along line 5—5 of FIG. 4.

The construction of each of the regulators 32, 33a–33c is best shown in FIG. 5. Although only one flow regulator 33b is shown therein, it will be understood that the remaining flow regulators 33a and 33c are identical to flow regulator 33b. Only flow regulator 33b will therefore be described in detail.

Flow regulator 33b has a body formed from a bottom or lower portion 40 and a top or upper portion 41. A cavity is formed within these two body portions 40, 41 (when combined) and is comprised of an upper or diaphragm chamber 43 formed in the upper portion 41, and a lower chamber 44 which is formed in the lower portion 40.

The upper and lower chambers 43, 44 are separated by a diaphragm in the form of a flexible member, such as a piece of neoprene rubber 46 which is sandwiched between the upper and lower portions 41, 40. It may be noted that the upper and lower portions of the flow regulator 33b can be fixed together to the base through the use of screws (not shown) extending through the base and into the top and bottom portions to solidly interconnect all three parts.

Diaphragm 46 forms part of a diaphragm valve mechanism which is used to open and close an inlet 47 formed in the bottom of lower chamber 44. More particularly, the diaphragm valve further includes a base element 49 located adjacent the bottom of the neoprene diaphragm 46, which has a stem portion 50 that extends through a hole 51 provided in the middle of the diaphragm 46. A metal disk 52 fits over the stem 50 of the base element 49 and is fixed in place through a press fit and/or adhesive securement adjacent the top surface of the diaphragm 46. A valve pin 54 extends from the bottom of the base element 49 and has one end fixed to a valve member 55. The valve member 55 seats against a valve seat formed by an annular shoulder 56 in the inlet 47 along an O-ring seal 58 provided on the top surface of the valve member 55. A spring 59 urges the valve member 55 into engagement with the valve seat 56.

An upper chamber air inlet line is formed in the flow regulator 33b which comprises a channel 62a that communicates with an inlet 64 of the solenoid valve 34b, and a channel 62b which communicates with an outlet 65 of solenoid valve 34b and the upper chamber 43. Standard solenoid valves, such as conventional bubble-tight EV Clippard valves, are used herein to open and close channels 62a, 62b.

Figure 4:
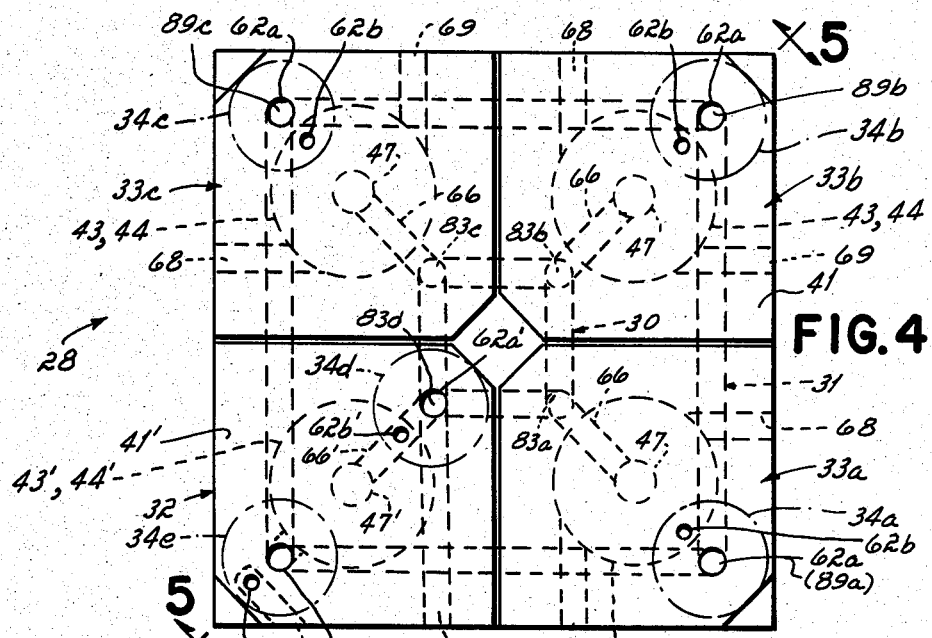
FIG. 4 is a top plan view of the regulator assembly of FIG. 2.

An air inlet line 66 is additionally provided in the lower portion 40 which communicates with inlet 47 of lower chamber 44. Inlet line 66 connects inlet 47 with the first manifold 30. Lower chamber 44 also has an outlet 68 which extends from the lower chamber to the exterior of the lower portion 40 (FIG. 4). A similar line 69 can additionally be provided to which a pressure gauge can be connected for measuring the pressure in the lower chamber 44.

As noted, each of the flow regulators 33a and 33c are substantially identical to flow regulator 33b in construction. Control regulator 32 is also of nearly identical construction to that of flow regulators 33a, 33b and 33c with certain exceptions. It will thus be understood that primed numbers used in depicting and describing control regulator 32 indicate elements which are identical to those already described in relation to flow regulator 33b.

Control regulator 32 differs in construction from flow regulator 33b in that an air flow restrictor in the form of a sapphire plate 75 having a small hole therethrough and carried in a plate mount 76 is located in the channel 62a'. As will be made clear hereafter, restriction of the flow of air into the upper chamber 43' enables better control over the pressurization of this upper chamber. Upper chamber 43' of the control regulator is also provided with an exhaust line comprised of a channel 70a which interconnects the upper chamber 43' with an inlet 71 of solenoid valve 34e, and a channel 70b which interconnects an outlet 73 of solenoid valve 34e with an exhaust port 74 formed in the exterior of upper portion 41'. Upper chamber 43' of the control regulator also has a greater volume than upper chamber 43 of the flow regulator. The flow regulator's upper chambers 43 have a reduced volume to minimize air back flow from these upper chambers when the flow regulators are reset, as will be made more clear hereafter.

An outlet line 73 communicates with the lower chamber 44'. It will be noted that channel 62*a'* and 66' intersect in the control regulator 32 for reasons which will now be made apparent.

Manifold Assembly

Manifold block 29 has two air distribution manifolds 30, 31 formed therein. With particular reference to FIG. 3, the first manifold 30 serves to direct a source of high pressure air, such as air from a compressor or shop air, to each of the regulators 32, 33*a*–33*c*. The first manifold 30 has an inlet line 81 to which the high pressure air is connected. Four outlets 83*a*–83*d* extend from the manifold 30. Each of the outlets 83*a*–83*c* are connected to the inlet line 66 of each of the flow regulators 33*a*–33*c*, respectively. It may be noted that a hollow pin 84 is provided for this connection to ensure proper alignment of the regulators with the first manifold outlets during assembly.

Outlet 83*d* of first manifold 30 is likewise connected to inlet 66' of the control regulator 32, and also thereby communicates with channel 62*a'*. The high pressure compressed air from the source A is thus made available at each of the valve inlets 47, 47' through the first manifold 30. Passage of this pressurized air into the regulator lower chambers 44, 44' is of course controlled by operation of the respective diaphragm valve assemblies, which are ordinarily biased to close the inlets 47, 47'.

The second manifold 31 formed in the manifold block 29 serves to interconnect outlet 73 of the lower chamber 44' of the control regulator 32 with each of the flow regulator channels 62*a* which lead to the inlets of the solenoid valves 34*a*–34*c*. A plurality of outlets 89*a*–89*d* are provided in the second manifold 31 to this end. That is, outlets 89*a*–89*c* each connect to a channel 62*a* of a respective flow regulator 33*a*–33*c*, while second manifold outlet 89*d* connects to outlet line 73 of the control regulator 32.

System Operation

The manner of independently setting each of the flow regulators 33*a*–33*c* can now be particularly described. Reference to FIG. 5 will be most helpful in this regard, with ancillary reference to FIGS. 3 and 4.

Each of the flow regulators 33*a*–33*c* is independently and variably set to a predetermined pressure for establishing the flow rate of the particular air stream that a respective regulator controls. For purposes of illustration herein, it can be assumed that an atomizing air stream of 50 psi is to be set by flow regulator 33*b*. Solenoid valve 34*d* of the control regulator 32 is then actuated to open the valve for a predetermined amount of time to permit air to flow through channel 62*b'* into the upper diaphragm chamber 43' of the control regulator 32 to pressurize the upper chamber 43' to a predetermined value, e.g., 50 psi. Solenoid valve 34*d* is then closed sealing the upper chamber 43'.

The air flow restrictor in the form of the sapphire plate 75 inserted in the air flow line 62*a'* serves to substantially reduce the rate of air flow to the upper chamber 43' to thereby permit more accurate control of the pressurization of the upper chamber 43'. That is, pressurization of the upper chamber 43' takes place over a longer period of time enabling more precise control over the pressurization.

Pressurization of the upper chamber 43' causes the diaphragm valve assembly of the control regulator 32 to move outwardly from the upper chamber, or downwardly as illustrated in FIG. 5. This causes the valve member 55' to unseat to permit a flow of high pressure shop air from the inlet 66' through the inlet 47' and into the lower chamber 44' of the control regulator. Valve member 55' remains unseated until the pressure in the upper and lower chambers 43', 44' roughly equalize, at which point the valve member 55' reseats. For example, with a pressure of 50 psi in the upper chamber 43', the diaphragm valve assembly would remain unseated (open) until a corresponding pressure of 50 psi is established in the lower chamber 44', whereupon the spring biased valve member 55' closes the inlet 47'. Should the pressure in the lower chamber drop below that of the upper chamber, the valve member 55' will again unseat, allowing air flow through inlet 47' until a pressure equilibrium is again established.

Since the control regulator's lower chamber 44' is connected to the second manifold 31 via the open outlet line 73, second manifold 31 is likewise pressurized to the same extent as the lower chamber of the control regulator, e.g., 50 psi.

A particular flow regulator, such as the atomizing regulator 33*b*, can now be set to the desired predetermined air pressure value, which herein has been given as 50 psi, by operating its solenoid valve 34*b* to permit the pressurized air in the second manifold 31 to pressurize the upper chamber 43 of the regulator 33*b*. Once a sufficient time, i.e., 1 second, has passed for the pressure to equalize between the manifold 31 and the upper chamber 43, the solenoid valve 34*b* is then closed sealing the upper chamber 43. Upper chamber 43 has now been pressurized to a predetermined amount, e.g., 50 psi. This pressurization causes its diaphragm valve assembly to unseat valve member 55 to permit high pressure air to flow through line 66 (connected to the first manifold 30) through the inlet 47 into the lower chamber 44 of the flow regulator. The distance the valve member 55 unseats is related to the pressure in the upper chamber 43 of the flow regulator 33*b*, and is made to correspond to a predetermined pressure for the air flow into the lower chamber 44, e.g., 50 psi. That is, the pressure of the upper chamber determines the distance which the valve member unseats, with the distance being directly related to the pressure of the air stream allowed to pass into the lower chamber.

Air flowing into the lower chamber 44 passes through the outlet 68 where it is then directed to the powder spray system, in this case to the atomizing chamber 27. Since a vent in the form of the outlet 68 is provided for the lower chamber of the flow regulator 33*b*, the valve member 55 remains unseated, and the flow rate of the air stream through the flow regulator remains constant, e.g., 50 psi, as long as the flow line to the powder system remains open. The atomizing air stream is thus set at a predetermined flow pressure in this manner.

It is typically the case that different flow rates, i.e., pressures, are desired for each of the air streams in the powder spray system. In order to set another flow regulator, such as the fluidizing regulator 33*a*, to a different pressure for the fluidizing air stream, upper chamber 43' of the control regulator 32 and the second manifold 31 are first exhausted. Upper chamber 43' is exhausted by actuating solenoid valve 34*e* to interconnect and open the upper chamber 43' to the exhaust port 74. This also serves to exhaust both the lower chamber 44' as well as the second manifold 31 since the diaphragm valve is self-relieving. To this end, base element 49' of the diaphragm valve assembly has a channel 92 extending therethrough which interconnects the upper and lower chambers 43', 44'. A seat 93 is formed in the base element 49' into which a head 94 provided on an end of pin 54' seats in air sealing engagement. When upper chamber 43' is exhausted, pressurized air in lower chamber 44' causes the diaphragm 46' to move outwardly from the lower chamber 44', or upwardly as shown in FIG. 5. This causes head 94 to become unseated, allowing air to escape from the lower chamber 44' and from the second manifold 31 into the upper chamber 43', where it is then exhausted. Head 94 eventually reseats in seat 93 once pressure has been relieved from the lower chamber 44' and the second manifold 31. This again seals the upper and lower chambers 43', 44' from each other.

With the control regulator 32 and second manifold 31 now exhausted, solenoid valve 34d once again is actuated to allow a second predetermined amount of air into the control regulator's upper chamber 43' to thereby pressurize it to a second predetermined pressure. The diaphragm valve assembly of the control regulator thereby opens the inlet 47' of the lower chamber 44' to allow a corresponding air pressure to be developed in the lower chamber 44' and the second manifold 31. Solenoid valve 34a of the fluidizing flow regulator is then actuated to pressurize the upper chamber 43 of the fluidizing regulator 33a to the pressure in the second manifold 31, thereby establishing a corresponding air pressure for the air stream passing through its lower chamber 44 to the fluidizing inlet 21 of the powder system.

The foregoing procedure is of course applicable to setting the air pressure of the remaining flow regulator in this system, namely, the delivery flow regulator **33*c*** which provides the delivery air stream. Although three regulators for controlling three different air streams are illustrated in this embodiment, it will be recognized that any number of flow regulators can be set in the foregoing manner. It will thus be seen that this invention provides a compact and relatively inexpensive variable air-piloted air regulator system for independently setting the flow rates of a plurality of different air streams. The air regulator system of this invention is particularly amenable to use with a programmable controller which is capable of rapidly operating the solenoid valves of the regulators to control and regulate the various air pressures in a powder spray system which is entirely automated. Thus, while the invention has been described in relation to a presently preferred embodiment, those skilled in the art will recognize modifications of structure, arrangement, portions, elements, materials and components which can be used in the practice of the invention without departing from the principles of this invention.

What is claimed is:

1. An apparatus for individually and independently setting the pressure of a plurality of air streams in a powder spray system having a fluidizing air stream, an atomizing air stream and a delivery air stream, comprising:
 a control regulator,
 means for selectively setting the output pressure of said control regulator,
 first, second and third flow regulators, each flow regulator being operable to control the pressure of one of said fluidizing, atomizing and delivery air streams,
 pressure setting means selectively interconnecting said control regulator to each of said first, second and third flow regulators for individually setting the pressures of said first, second and third flow regulators independently of one another.

2. Apparatus for independently and individually setting the pressure of air streams in a fluidizing air line, an atomizing air line and a delivery air line in a powder spray system, comprising:
 an air supply;
 a control regulator connected to said air supply, said control regulator having pressure setting means for selectively setting the output pressure in said control regulator at different, predetermined pressures;
 first, second and third flow regulators connecting said air supply to said fluidizing air line, said atomizing air line and said delivery air line, respectively, air from said air supply being directed through each of said flow regulators to form separate air streams in each of said air lines;
 valve means for selectively interconnecting each of said first, second and third flow regulators with said control regulator to set the pressure within said first, second and third flow regulators independently of one another at pressures substantially equal to said predetermined pressures set by said control regulator.

3. The apparatus of claim 2 wherein each of said first, second and third flow regulators comprises:
 a body,
 an upper chamber and a lower chamber defined within said body, said upper chamber having an air inlet communicating with said control regulator, said lower chamber having an air inlet connected to said air supply and an air outlet connected to an air line,
 a first valve member connected to said air inlet of said upper chamber, said first valve member being operable to open for a predetermined time and then close to pressurize said upper chamber with a pressure substantially equal to said predetermined air pressure of said control regulator;
 a diaphragm separating said upper and lower chambers,
 a second valve member connected to said diaphragm for movement therewith, and
 a substantially air-tight seat for said valve member formed in said air inlet of said lower chamber,
 said upper chamber when pressurized moving said diaphragm to thereby unseat said valve member to open said air inlet and permit the flow of air from said air supply into said lower chamber and then out into an air line through said air outlet.

4. The apparatus of claim 2 wherein first, second and third predetermined presures are sequentially and independently established in each of said first, second and third flow regulators by said pressure setting means of said control regulator, said predetermined air pressures being utilized by said pressure control means of said first, second and third flow regulators to establish an air stream through said first flow regulator corresponding to said first predetermined pressure set by said control regulator, an air stream through said second flow regulator corresponding to said second predetermined pressure set by said control regulator, and an air stream through said third flow control regulator corresponding to said third predetermined pressure set by said control regulator.

5. The apparatus of claim 2 in which said air supply comprises:
   a source of pressurized air;
   a first manifold connected to said source of pressurized air;
   said control regulator and said first, second and third flow regulators being connected to said first manifold.

6. The apparatus of claim 2 in which said control regulator includes a pressure chamber, said valve means of said control regulator comprising:
   a valve having an inlet communicating with said air supply, and an outlet communicating with said pressure chamber;
   said valve being operable to open for a predetermined period of time and then close to permit air from said air supply to enter said pressure chamber to establish a selected air pressure therein.

7. The apparatus of claim 6 in which said control regulator further includes a channel connecting said air supply with said inlet of said valve, said channel being formed with an air flow restrictor to control the flow of air from said air supply into said inlet of said valve.

8. The apparatus of claim 2 in which said flow regulators each include a pressure chamber, said pressure control means of each said first, second and third flow regulators comprising:
   a second manifold connected to said control regulator, the pressure in said second manifold being substantially equal to said predetermined pressure in said control regulator;
   first valve means having an inlet communicating with said second manifold, and an outlet communicating with said pressure chamber, said first valve means being selectively and individually operable to pressurize said pressure chamber with said predetermined fluid pressure of said second manifold and said control regulator;
   second valve means disposed within said pressure chamber and communicating with said air supply, said second valve means be operable to open in response to the pressure in said pressure chamber to permit air from said air supply to flow through said flow regulator into one of said air lines at a pressure substantially equal to said predetermined pressure set by said control regulator.

9. A variable air-piloted air regulator system for independently controlling a plurality of air streams comprising:
   a source of pressurized air,
   a first manifold connected to said source of pressurized air,
   a control regulator having an air-piloted valve,
   first and second flow regulators each having an air-piloted valve,
   said control regulator and first and second flow regulators being connected to said first manifold for individually controlling a separate air stream by operation of respective air-piloted valves,
   a second manifold interconnecting said control regulator with each of said first and second flow regulators,
   control valve means for operating said air-piloted valve of said control regulator to pressurize said second manifold to a predetermined control pressure,
   first valve means for controlling air flow from said second manifold to said first flow regulator, said air flow operating said air-piloted valve of said first flow regulator to establish an air stream through said first flow regulator at a first predetermined pressure directly related to said control pressure; and
   second valve means for controlling air flow from said second manifold to said second flow regulator, said air flow operating said air-piloted valve of said second flow regulator to establish an air stream through said second flow regulator at a second predetermined pressure directly related to said control pressure,
   said control valve means being operable to sequentially establish control pressures of different pressures for setting said first and second flow regulators at different first and second predetermined pressures.

10. The air regulator system of claim 9 wherein each of said control regulator and said first, second and third flow regulators comprises:
    a body,
    an upper chamber and a lower chamber defined within said body, said chambers being separately pressurizable, said upper chamber having an air inlet, said lower chamber having an air inlet and an air outlet,
    a diaphragm separating said upper and lower chambers,
    a valve member connected to said diaphragm for movement therewith, and
    a substantially air-tight seat for said valve member about said lower chamber air inlet,
    said upper chamber when pressurized moving said diaphragm to thereby unseat said valve member to establish an air stream through said regulator.

11. The air regulator system of claim 10 further including a third flow regulator having an air-piloted valve, said third flow regulator being connected to said first manifold for controlling an air stream by operation of its air-piloted valve, said third flow regulator being interconnected to said control regulator through said second manifold, and third valve means for controlling air flow from said second manifold to said third flow regulator, said air flow operating said air-piloted valve of said third flow regulator to establish an air stream through said third flow regulator at a third predetermined pressure directly related to said control pressure,
    said control valve means operable to establish yet another control pressure for setting said third flow regulator at a third predetermined pressure different from said first and second predetermined pressures,
    said three flow regulators respectively controlling air pressures in a delivery air stream, an atomizing air stream and a fluidizing air stream in an electrostatic powder spray system.

12. A variable air-piloted air regulator system for independently controlling a plurality of air streams, comprising:
    a source of pressurized air,
    a control regulator having a body, an upper chamber and a lower chamber defined within said body, said chambers being separately pressurizable, said upper chamber having an inlet and an outlet, said lower chamber having an inlet and an outlet, and
    an air piloted valve means operably connected to said upper chamber for opening and closing said lower chamber inlet, first and second flow regulators, each flow regulator comprising a body, an upper chamber and a lower chamber defined within said body, said chambers being separately pressurizable, said upper chamber having an inlet, said lower chamber having an inlet and an outlet, and an air piloted valve means operably connected to said upper chamber for opening and closing said lower chamber inlet, a first manifold having an inlet to which said source of pressurized air is connected and a plurality of outlets which respectively communicate with each lower chamber inlet of said control regulator, said first and second flow regulators and said upper chamber inlet of said control regulator, a second manifold having an inlet communicating with said lower chamber outlet of said control regulator, a plurality of outlets which respectively communicate with each upper chamber inlet of said first and second flow regulators, and a manifold exhaust, a first valve controlling air flow from said second manifold to said upper chamber inlet of said first flow regulator, a second valve controlling air flow from said second manifold to said upper chamber inlet of said second flow regulator, a control valve controlling air flow from said first manifold to said upper chamber of said control regulator, an exhaust valve for exhausting said upper chamber of said control regulator through said control valve upper chamber outlet, said first flow regulator being set by actuating said control valve to permit a flow of air into said upper chamber of said control regulator to a first predetermined pressure therein and then closing said upper chamber, said pressurization of said upper chamber thereby causing said air-piloted valve means of said control regulator to open said lower chamber inlet to allow a flow of air into said lower chamber of said control regulator from said first manifold and through said lower chamber outlet of said control regulator into said second manifold to a first pressure, said first valve of said first flow regulator then being actuated to permit said air at said first pressure to flow into its upper chamber pressurizing said upper chamber to said first pressure and then closing said upper chamber, pressurization of said first regulator upper chamber thereby causing said air-piloted valve means of said first regulator to open its lower chamber inlet a predetermined amount to allow a flow of air into said lower chamber from said first manifold and out its outlet at said first pressure, said second flow regulator being set to a different air flow pressure by actuating said control regulator exhaust valve to exhaust said upper chamber of said control regulator and actuating said second manifold exhaust valve to exhaust said second manifold, and then actuating said control valve to permit a flow of air into said upper chamber of said control regulator to a second predetermined pressure therein and then closing said upper chamber, said pressurization of said upper chamber causing said air-piloted valve means and said control regulator to open said lower chamber inlet to allow a flow of air into said lower chamber of said control regulator from said first manifold and through said lower chamber outlet of said control regulator into said second manifold to a second pressure, said second valve of said flow regulator then being actuated to permit said air at said second pressure to flow into its upper chamber pressurizing said upper chamber to said second pressure and then closing said upper chamber, thereby causing said air-piloted valve means of said second regulator to open its lower chamber inlet a predetermined amount to allow a flow of air into said lower chamber from said first manifold and out its outlet at said second pressure.

13. The air regulator system of claim 12 wherein each of said air-piloted valve means for all of said regulators comprises a diaphragm separating the respective upper chamber from a lower chamber, a valve member connected to said diaphragm for movement therewith, and a substantially air-tight seat for said valve member about said lower chamber inlet, said upper chamber when pressurized moving said diaphragm to thereby unseat said valve member.

14. The air regulator system of claim 13 wherein said second manifold exhaust comprises a one-way valve between said upper and lower chambers of said control regulator, said one-way valve being closed when said upper chamber is pressurized, whereby exhaustion of said upper chamber exhausts said lower chamber and said second manifold.

15. The air regulator system of claim 14 wherein each of said first valve, second valve, control valve, and control regulator exhaust valve comprises a solenoid valve.

16. Apparatus for independently setting the pressure of a fluid stream in a plurality of separate delivery lines, comprising:

a fluid supply;

a control regulator connected to said air supply, said control regulator having pressure setting means for selectively setting the fluid pressure in said control regulator at different, predetermined pressures;

a plurality of fluid flow regulators each connecting said fluid supply to one of said delivery lines, fluid from said fluid supply being directed through each of said fluid flow regulators to form separate fluid streams in each of said delivery lines;

valve means for selectively connecting each of said fluid flow regulators with said control regulator for individually setting the pressure of said fluid flow regulators independently of one another at pressures substantially equal to said predetermined pressures set by said control regulator.

* * * * *